UNITED STATES PATENT OFFICE.

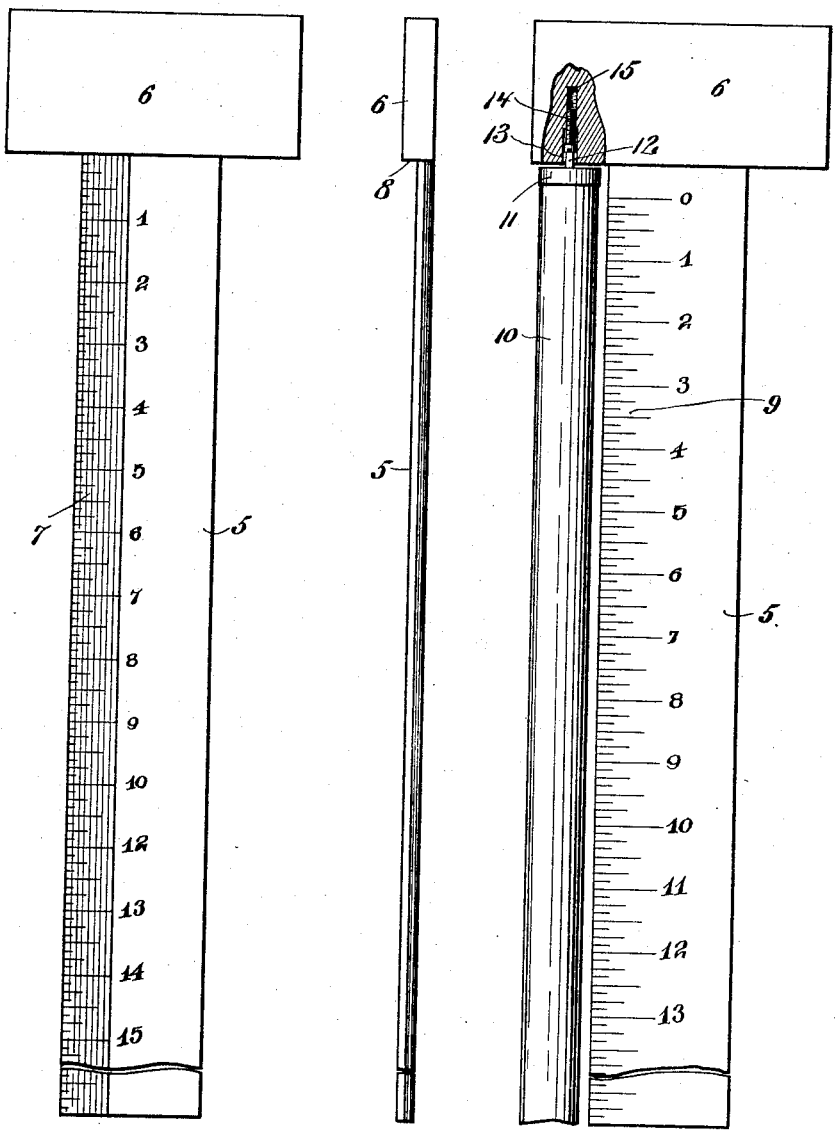

PAUL A. BOYNTON, OF PALATINE, ILLINOIS.

MEASURING DEVICE.

1,226,855.   Specification of Letters Patent.   Patented May 22, 1917.

Application filed October 20, 1915.  Serial No. 56,902.

*To all whom it may concern:*

Be it known that I, PAUL A. BOYNTON, a citizen of the United States, residing at Palatine, in the county of Cook and State of Illinois, have invented certain new and useful Improvements in Measuring Devices, of which the following is a specification.

The device which is the subject matter of the present application for patent is designed more particularly for makers and fitters of window shades, it being constructed and arranged so that by its use the shade cloth and the stick or roller may be accurately measured to obtain a perfect fit.

The invention consists in a novel combination and arrangement of parts to be hereinafter described and claimed, and in order that the same may be better understood, reference is had to the accompanying drawing, in which—

Figure 1 is a top plan view of the device;

Fig. 2 is an edge view, and

Fig. 3 is an inverted plan view, partly in section.

Referring specifically to the drawing, the device comprises a straight measuring blade 5 having at one end a cross bar 6, these parts being rigidly connected by means of a tenon-and-mortise, or other suitable joint. The cross bar 6 extends at a right angle to the blade 5, and the device therefore resembles a draftman's T-square. The blade 5 is of sufficient length to measure shade cloth of the greatest width, and it has one of its faces beveled adjacent to one edge and provided with inch graduations 7. The cross bar 6 is thicker than the blade 5. The side of the blade having the graduations 7 is flush with one side of the cross bar, and the opposite side of the cross bar is beyond the plane of the corresponding side of the blade, so that the inner edge of the cross bar forms an abutment or shoulder 8 extending across the last-mentioned face of the blade.

In use the cross bar 6 is set so that the shoulder 8 engages one edge of the cloth to be measured and cut, with the blade 5 extending straight across toward the opposite edge. The cloth is then measured to obtain the desired width, the measurement being taken with the graduated portion 7 of the blade. Accurate squaring is not necessary, the cross bar 6 acting only as an abutment, so that the operator need not look at both ends of the blade to determine the desired dimension. An ordinary rule or measuring stick is not satisfactory in this respect, as the operator must first place the zero mark on the edge of the cloth, and then hold the rule down while crossing over to the other side to make the measurement, this frequently resulting in inaccuracy, especially when cloth of considerable width is handled.

The reverse side of the measuring blade 5 also has inch graduations, as indicated at 9, starting a short distance from the cross bar 6. This side of the blade is intended for measuring shade rollers or sticks. These are usually provided with the necessary spring end fittings, and they are made sufficiently long to permit the ends to be trimmed off at any distance from the spring ends, and fitted with the usual spike plates by the shade maker. When taking measurements from the window jamb brackets to determine the length of the roller, allowance must be made for the end plates of the roller, and this is often inaccurate and takes time, especially where the brackets are inside the jambs. Hence, there has been provided a space preceding the zero mark on the scale 9 to allow for the thickness of the end plates, so that the roller 10 can be placed as shown in Fig. 3 and measured for length without reference to allowances of any kind.

The end of the roller 10 shown is that which contains the spring, said end being provided with the usual end plate 11 and projecting spindle 12. The inner edge of the cross bar 6, on one side of the blade 5, has a recess 13 which is parallel to the blade and designed to accommodate the spindle 12 to bring the plate close to or up against the cross bar, and in this recess is a screw 14 which is set in a tapped bore 15 forming a continuation of the recess. The screw 14 may be advanced or retracted to serve as an abutment against which the spindle 12 seats, thereby making a slight spacing adjustment between the roller end and the inner edge of the cross bar as shown in Fig. 3. Thus, if the screw is advanced, the roller will be trimmed off slightly longer, so that the clearance between the shade brackets and the roller ends will be shorter; or if the screw is retracted, the roller will be trimmed off slightly shorter making it run more freely in the brackets.

The head of the screw 14 is nicked so that a screw driver may be employed for advancing or retracting it.

By the use of the device the shades can be accurately and easily fitted, it being necessary only to follow the scales for ordinary work. Occasionally, when extreme accuracy is necessary, the screw adjustment is employed.

I claim:—

1. A measuring device comprising a graduated measuring blade, and a cross bar on one end of the blade, said cross bar having on one side of the blade an open recess extending parallel to the blade, and adapted to receive the end portion of the part to be measured.

2. A measuring device comprising a graduated measuring blade, a cross bar on one end of the blade, said cross bar having on one side of the blade an open recess extending parallel to the blade, and adapted to receive the end portion of the part to be measured, and an adjustable abutment in said recess engageable by said end portion.

3. A measuring device comprising a graduated measuring blade, a cross bar on one end of the blade, said cross bar having on one side of the blade an open recess extending parallel to the blade, and adapted to receive the end portion of the part to be measured, and an abutment screw carried by the cross bar and extending into the recess, and engageable by said end portion.

In testimony whereof I affix my signature in presence of two witnesses.

PAUL A. BOYNTON.

Witnesses:
GEORGE F. MATTHEI,
HENRY C. MATTHEI.

Copies of this patent may be obtained for five cents each, by addressing the "Commissioner of Patents, Washington, D. C."